(12) United States Patent
Suzuki et al.

(10) Patent No.: US 7,584,551 B2
(45) Date of Patent: Sep. 8, 2009

(54) ABSOLUTE POSITION MEASURING APPARATUS

(75) Inventors: Masamichi Suzuki, Kawasaki (JP); Shuji Hayashida, Kawasaki (JP); Shozaburo Tsuji, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 0 days.

(21) Appl. No.: 12/219,910

(22) Filed: Jul. 30, 2008

(65) Prior Publication Data

US 2009/0031578 A1 Feb. 5, 2009

(30) Foreign Application Priority Data

Aug. 3, 2007 (JP) ............................. 2007-203299

(51) Int. Cl.
*G01B 3/10* (2006.01)

(52) U.S. Cl. ............................ 33/820; 33/813; 33/831

(58) Field of Classification Search ........... 33/813–816, 33/818–820, 831, 783–784, 792, 794, 795, 33/1 PT
See application file for complete search history.

(56) References Cited

U.S. PATENT DOCUMENTS 6,772,087 B2 * 8/2004 Sasaki ....................... 702/150

7,013,575 B2 * 3/2006 Strasser et al. ................ 33/706
7,385,389 B2 * 6/2008 Tahara et al. ........... 324/207.17
7,467,480 B2 * 12/2008 Hayashida et al. ............ 33/813
2008/0265690 A1 * 10/2008 Sasaki et al. .................. 310/12

FOREIGN PATENT DOCUMENTS

| EP | 1 327 862 A2 | 7/2003 |
|---|---|---|
| JP | A-2003-207307 | 7/2003 |
| JP | A-2007-78459 | 3/2007 |
| JP | A-2007-304052 | 11/2007 |

* cited by examiner

*Primary Examiner*—Yaritza Guadalupe-McCall
(74) *Attorney, Agent, or Firm*—Oliff & Berridge, PLC (57) ABSTRACT

An absolute position measuring apparatus includes a first rotary encoder that detects a rotation of a spindle as a phase signal which varies in a first cycle and a second rotary encoder that detects the rotation of the spindle as another phase signal which varies in a second cycle. A rotation of a first rotor of the first rotary encoder is transmitted to a second rotor via a relay gear that is meshed with a first gear provided on an outer circumference of a first rotary cylinder and a second gear provided on an outer circumference of a second rotary cylinder. Thus, an absolute position of the spindle is calculated on the basis of two phase signals that are different in cycle. Further, it is not necessary to provide a conventionally-known spiral key groove so that the apparatus can be easily downsized. Manufacturing costs can be also reduced.

4 Claims, 7 Drawing Sheets

ABSOLUTE POSITION MEASURING APPARATUS

BACKGROUND OF THE INVENTION

1. Field of the Invention

The present invention relates to an absolute position measuring apparatus. Specifically, the present invention relates to an absolute position measuring apparatus such as a micrometer head, a micrometer, and a Holtest for measuring an absolute position of a spindle that rotatingly moves in an axial direction.

2. Description of Related Art

Conventionally, in a small-sized measuring apparatus for measuring a length, a size or the like such as a micrometer and a micrometer head, an object is measured by detecting a displacement of a movable member relative to a fixed member (for instance, see Document 1: JP-A-2003-207307 (FIGS. 1 and 4)).

An arrangement of a small-sized measuring apparatus disclosed in Document 1 to detect the displacement of the movable member relative to the fixed member will be described with reference to the attached drawings.

Figure 6:
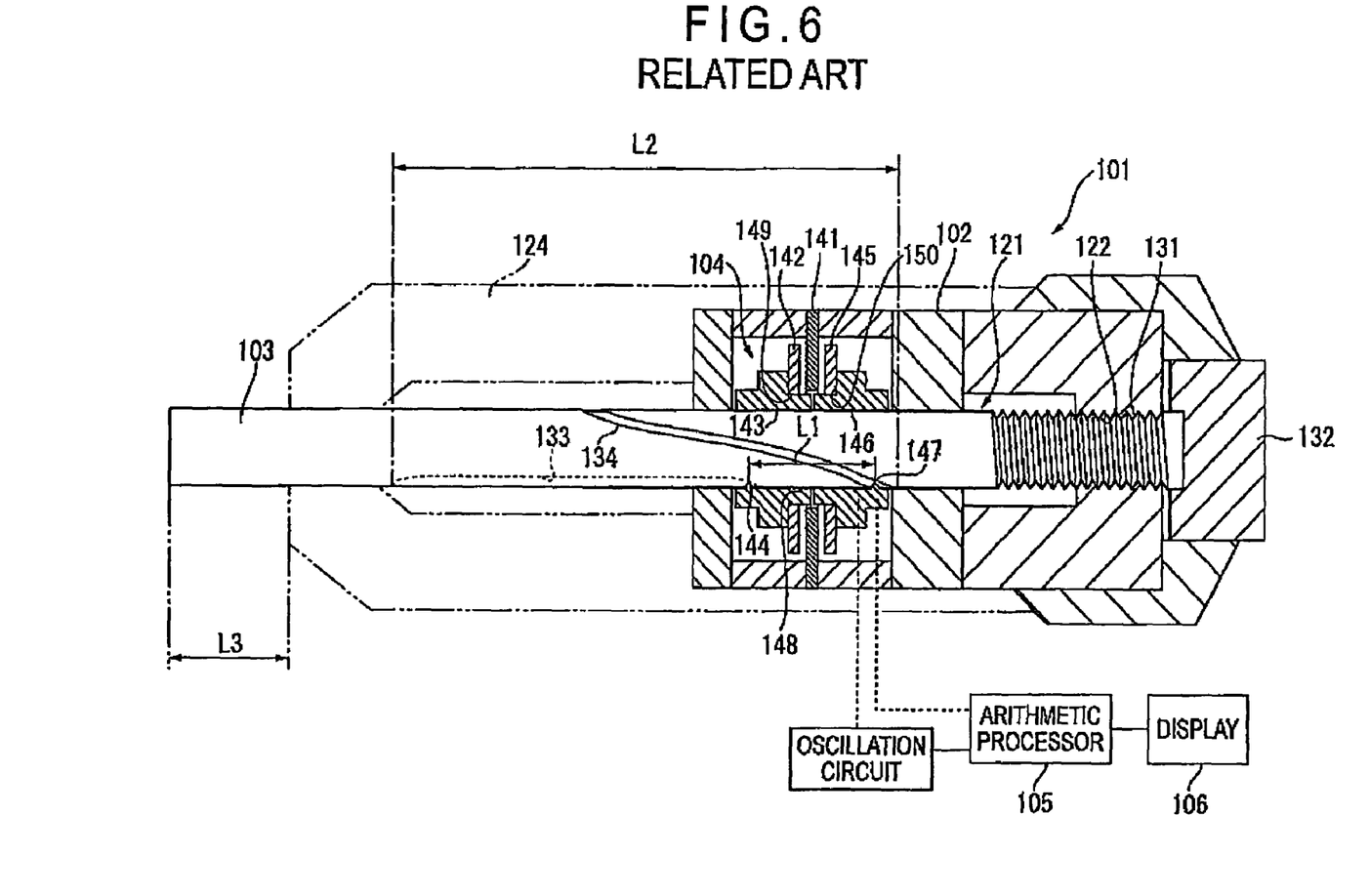
FIG. 6 is a cross-sectional view showing an absolute position measuring apparatus in a related art.

FIG. 6 illustrates a conventional micrometer head 101 as the small-sized measuring apparatus disclosed in Document 1.

The micrometer head 101 includes: a main body 102 having a through-hole 121; a spindle 103 that is inserted into the through-hole 121 and advanceable and retractable along the through-hole 121; a phase signal transmitter 104 that transmits a phase signal in accordance with an axial movement of the spindle 103; an arithmetic processor 105 that calculates an absolute position of the spindle 103 on the basis of the phase signal; and a display 106 that displays the calculated absolute position of the spindle 103.

An arrangement of the spindle 103 that is advanced and retracted relative to the main body 102 will be described below.

An internal thread 122 is provided on an inner circumference of the through-hole 121 of the main body 102. The spindle 103 is provided with a feed screw 131 screwed with the internal thread 122 of the main body 102 and a knob 132 on an end of the spindle 103. When the spindle 103 is rotated by the knob 132, the spindle 103 is advanced and retracted in an axial direction relative to the main body 102 due to the screw-engagement between the internal thread 122 and the feed screw 131.

The phase signal transmitter 104 includes two rotary encoders and transmits two phase signals that are different in cycle according to the axial movement of the spindle 103. These two rotary encoders include a stator 141 that is fixed to the main body 102 and two rotors 142 and 145 that are provided on both sides of the stator 141 so as to interpose the stator 141 therebetween.

The stator 141 and the rotors 142 and 145 will be described below in greater detail.

The stator 141 includes a through-hole 148 in the axial direction of the spindle 103 into which the spindle 103 is inserted. Two key grooves 133 and 134 are provided on an outer circumference of the spindle 103. The first key groove 133 is linearly provided along the axis of the spindle 103 and the second key groove 134 is provided spirally around the axis of the spindle 103. A first rotary cylinder 143 having a first key 144 engaged with the first key groove 133 on an inner circumference thereof and a second rotary cylinder 146 having a second key 147 engaged with the second key groove 134 on an inner circumference thereof are provided on an outer circumference of the spindle 103. The rotary cylinders 143 and 146 are provided on both sides of the stator 141 along the axis of the spindle 103.

The rotors 142 and 145 each having openings 149 and 150 respectively, through which the spindle 103 passes in the axial direction of the spindle 103, are provided on the rotary cylinders 143 and 146. In other words, the first rotor 142 is fitted to an outer circumference of the first rotary cylinder 143 and the second rotor 145 is fitted to an outer circumference of the second rotary cylinder 146. The rotors 142 and 145 respectively face each surface of the stator 141.

In such arrangement, a procedure for measuring the absolute position of the spindle 103 will be described below.

When the spindle 103 is rotated, the spindle 103 is advanced and retracted in the axial direction. At the same time, the first rotary cylinder 143 is rotated due to an engagement between the first key 144 and the first key groove 133, and the second rotary cylinder 146 is rotated due to an engagement between the second key 147 and the second key groove 134.

At this time, the first rotary cylinder 143 is rotated in synchronization with the spindle 103 since the first key groove 133 is linearly provided along the axial direction of the spindle 103. On the other hand, the second rotary cylinder 146 is rotated more slowly than the spindle 103 since the second key groove 134 is provided spirally around the axis of the spindle 103. Thus, a rotation speed difference between the two rotors 142 and 145 is generated so that the two rotary encoders 142 and 145 transmit two phase signals that are different in cycle.

Figure 7:
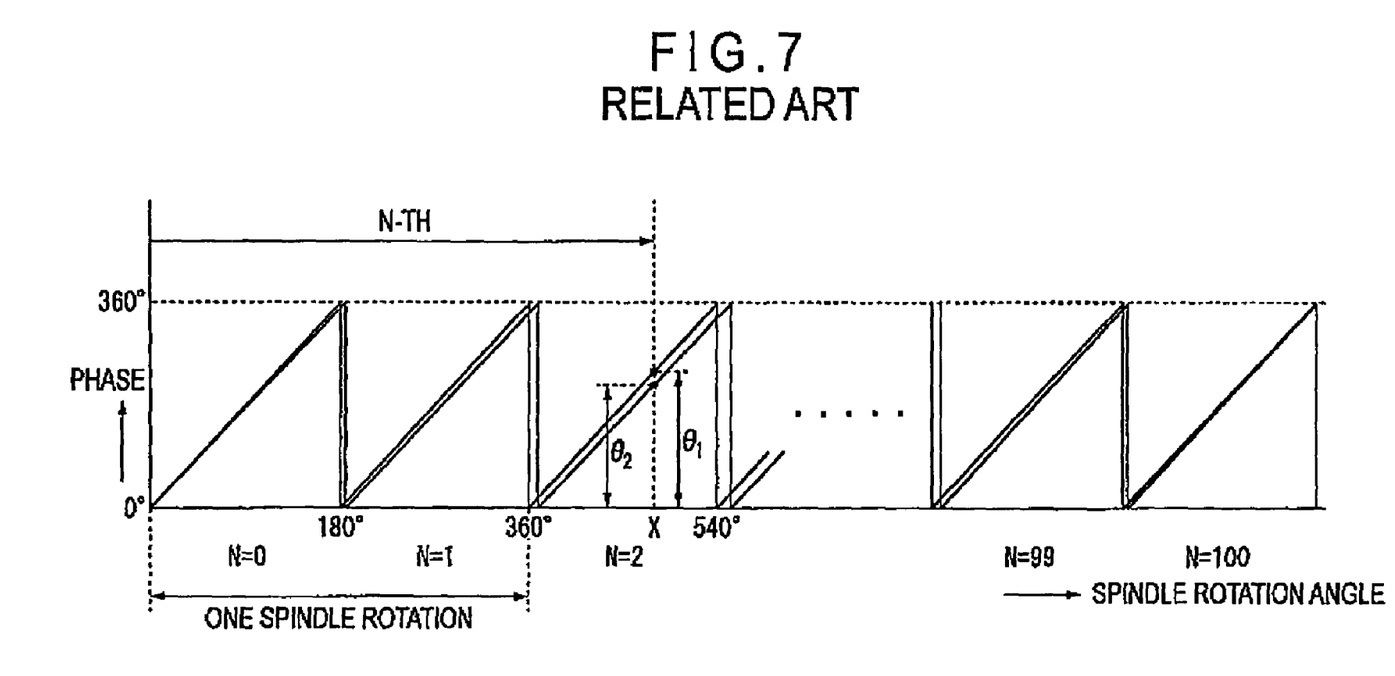
FIG. 7 illustrates a relationship between a rotation speed of a spindle and phase signals obtained from two rotors in the absolute position measuring apparatus in the related art.

Accordingly, a phase difference of the phase signals detected by the respective rotary encoders is always different, whereby a relationship as shown in FIG. 7 is observed between a rotation speed of the spindle 103 and the phase signals. For example, when a phase variation during 100 cycles is obtained from the first rotor 142 within a movable range of the spindle 103, another phase variation during 99 cycles is obtained from the second rotor 145 as shown in FIG. 7. The axial absolute position of the spindle 103 is calculated from the phase difference by taking advantage of a constant discrepancy in the phase difference between the two phase signals within the movable range of the spindle 103.

However, in such arrangement as shown in FIG. 6 of Document 1, since the two rotors 142 and 145 are provided so as to interpose the stator 141 therebetween, the two keys 144 and 147 that are provided on the rotary cylinders 143 and 146 in order to rotate the rotors 142 and 145 are spaced away from each other in the axial direction of the spindle 103 (See L1 of FIG. 6).

Since the two key grooves 133 and 134 engageable with the two keys 144 and 147 which are positioned away from each other in the axial direction of the spindle 103 must be carved on the spindle 3, start points of the respective key grooves 133 and 134 are largely shifted from each other. Consequently, a range L2 in which the key grooves 133 and 134 are carved is more widened than an axial movable range L3 of the spindle 103, which prevents downsizing of the absolute position measuring apparatus.

Further, since it is necessary that the key groove 134 is accurately machined on the outer circumference of the spindle 103, manufacturing costs are increased.

SUMMARY OF THE INVENTION

An object of the present invention is to provide an absolute position measuring apparatus for measuring an absolute position of a spindle, which is easily downsized and simple in manufacture.

An absolute position measuring apparatus according to an aspect of the present invention, includes: a main body; a spindle that is screwed with the main body to be advanceable and retractable while rotating about an axis thereof; a first rotary encoder that detects the rotation of the spindle as a phase signal that varies in a first cycle; a second rotary encoder that detects the rotation of the spindle as another phase signal that varies in a second cycle; and an arithmetic processor that calculates an absolute position of the spindle based on the phase signals output from the first and second rotary encoders; in which the fast rotary encoder includes: a first rotor, a first holder that rotatably holds the first rotor about the axis of the spindle and is rotated by the rotation of the spindle, the first holder being provided with a first gear on an outer circumference thereof; a first stator that is supported by the main body and provided facing the first rotor by a predetermined gap; the second rotary encoder includes: a second rotor; a second holder that rotatably holds the second rotor about the axis of the spindle and is provided with a second gear on an outer circumference thereof; a second stator that is supported by the main body and provided facing the second rotor by the predetermined gap; a relay gear that transmits a rotation of the first gear to the second gear; and the number of cogs for the first gear, the relay gear and the second gear is set to differentiate rotation speeds of the first gear and the second gear.

For determining the suitable number of the cogs for the first gear, the relay gear and the second gear in order to differentiate the rotation speeds of the first gear and the second gear, for example, the number of the cogs of the first gear may be set differently from that of the second gear, or the relay gear including a plurality of gears may be provided to change the rotation speed of the first gear before being transmitted to the second gear.

According to the aspect of the present invention, the first rotary encoder is provided in which the rotation of the spindle causes the rotation of the first holder and, simultaneously, the rotation of the first rotor. Then, the phase signal that varies in the first cycle in accordance with the rotation of the spindle is detected by the first rotor and the first stator. Similarly, the second rotary encoder is provided in which the relay gear transmits the rotation of the first gear to the second gear so that the rotation of the first holder causes the rotation of the second holder and, simultaneously, the rotation of the first rotor. Then, the phase signal that varies in the second cycle in accordance with the rotation of the spindle is detected by the second rotor and the second stator. Since the numbers of the respective cogs of the first gear, the relay gear and the second gear are set to differentiate the rotation speeds of the first gear and the second gear, the first cycle of the phase signal that is detected by the first rotary encoder and the second cycle of the phase signal that is detected by the second rotary encoder are differentiated. Accordingly, the absolute position of the spindle can be calculated on the basis of the phase signals that vary in two difference cycles.

Further, since the relay gear transmits the rotation of the first gear to the second gear, it is not necessary to provide both of a conventional linear key groove and spiral key groove on the spindle. Thus, the spindle can be shortened relative to an axial movable range of the spindle, which easily allows downsizing of the apparatus and reduction in manufacturing costs.

It is preferable that the first holder is cylindrical along an outer circumference of the spindle, the first rotor is fixed to a first end of the first holder, the second holder is cylindrical along the outer circumference of the first holder, the second rotor is fixed to a first end of the second holder and provided on the outer circumference of the first rotor, and a surface of the first stator that faces the first rotor and a surface of the second stator that faces the second rotor are provided in the same plane.

With this arrangement, a double cylinder structure is provided including the first holder and the second holder on the outer circumference of the spindle. Accordingly, a space for the first holder and the second holder can be lessened in the axial direction of the spindle, as compared to the related art in which the first holder and the second holder are provided in parallel in the axial direction of the spindle.

Further, the first rotor and the second rotor are fixed to the respective ends of the first holder and the second holder to dispose the second rotor on the outer circumference of the first rotor so that the surface of the first stator that faces the first rotor and the surface of the second stator that faces the second rotor are provided in the same plane. Accordingly, the second stator can be provided on the outer circumference of the first stator to form the double structure, or the first stator and the second stator can be integrally provided, thereby lessening a space for the two stators. Furthermore, when the first stator and the second stator are integrally provided, a number of parts can be reduced and assembly procedures can be simplified.

It is preferable that the first gear is provided to a second end of the first holder, the second gear is provided on a second end of the second holder and in parallel to the first gear in the axial direction of the spindle, and the relay gear includes a first relay gear that is meshed with the first gear, a second relay gear that is meshed with the second gear, and a shaft that coaxially supports the first relay gear and the second relay gear.

With this arrangement, since the first gear provided on the second end of the first holder and the second gear provided on the second end of the second holder are provided in parallel in the axial direction of the spindle, a rotation of the first gear can be transmitted to the second gear via the relay gear having the first relay gear, the second relay gear and the shaft that coaxially supports the first relay gear and the second relay gear. Briefly, the relay gear can be a one-stage gear having one rotary shaft. Thus, a space for the relay gear is lessened as compared to a relay gear having a multistage gear system, which allows further downsizing of the apparatus and reduction of the number of the parts, thereby simplifying assembly procedures.

DETAILED DESCRIPTION OF PREFERRED EMBODIMENT(S)

A micrometer head according to an exemplary embodiment of an absolute position measuring apparatus of the present invention will be described below with reference to the attached drawings.

Figure 1:
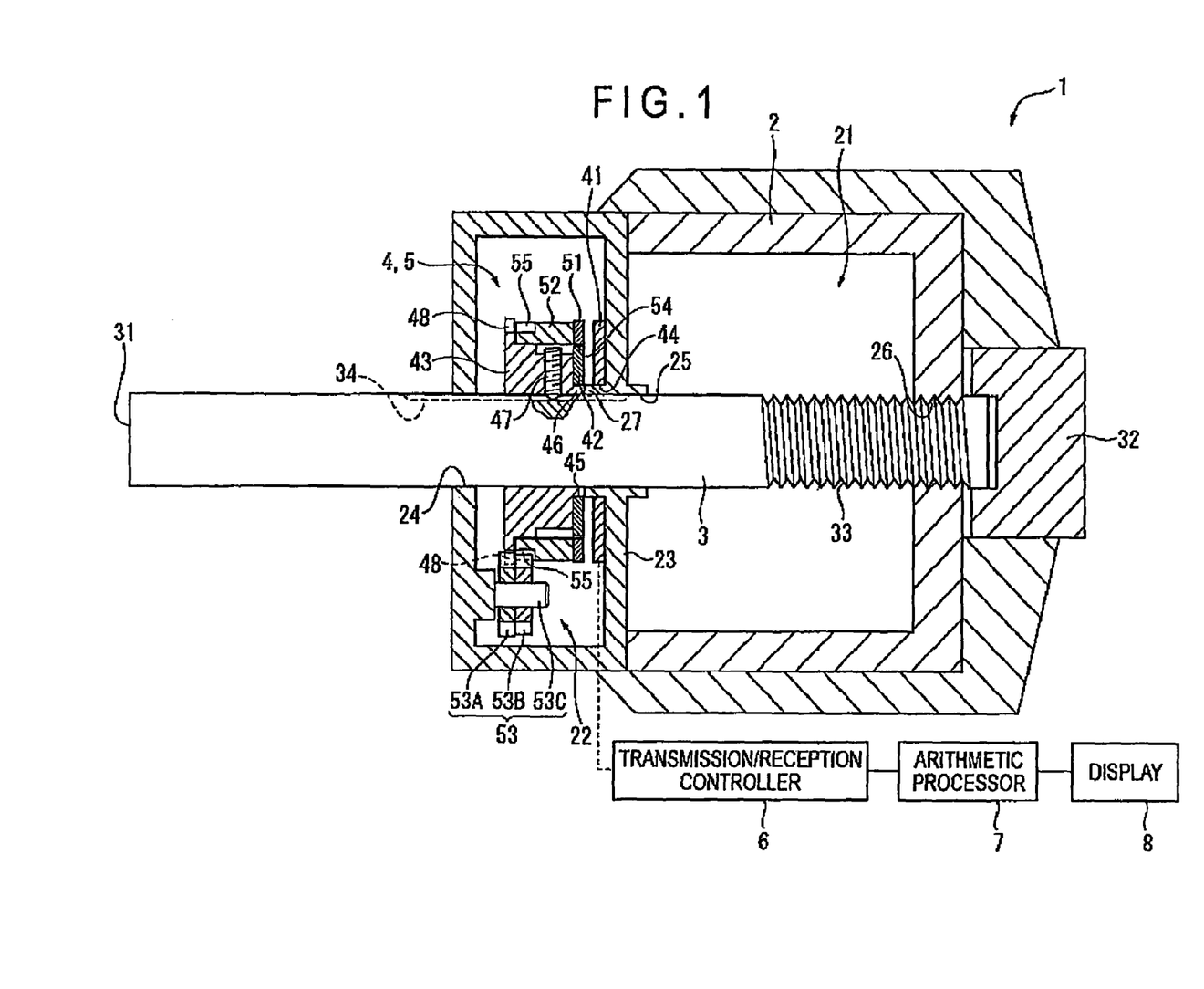
FIG. 1 is a cross-sectional view showing an absolute position measuring apparatus according to an exemplary embodiment of the present invention.
Figure 2:
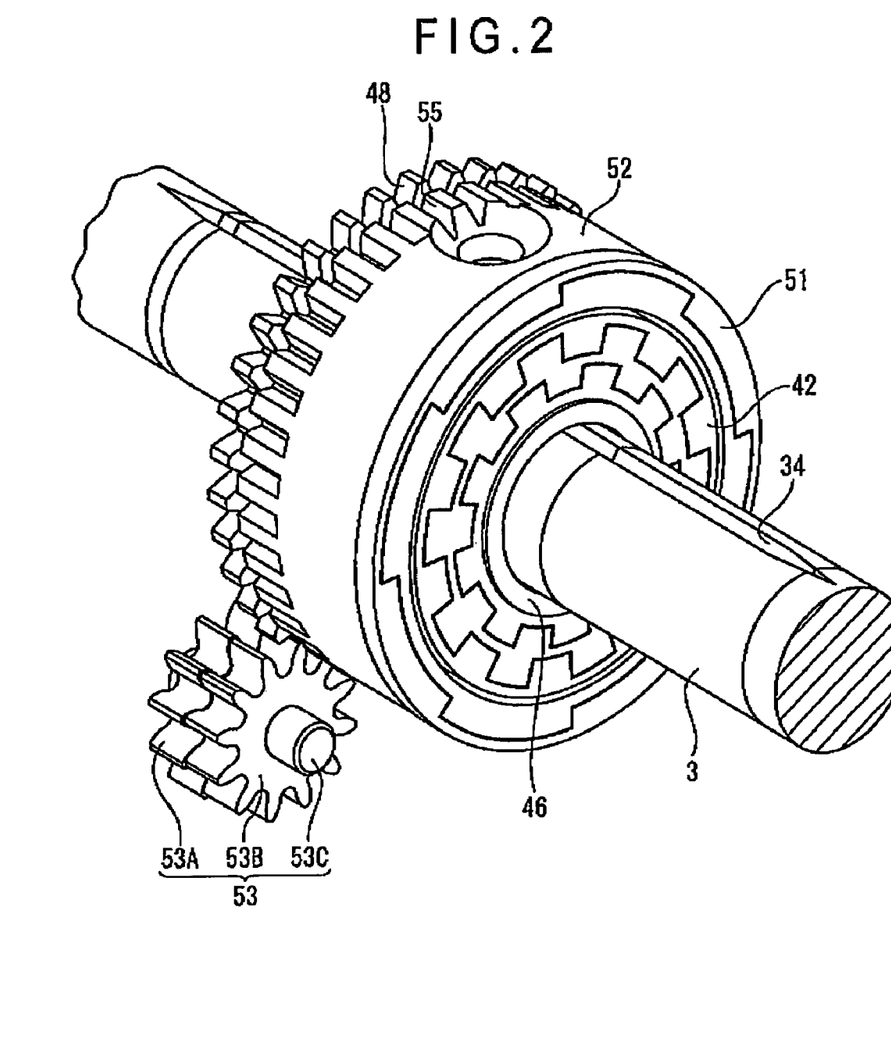
FIG. 2 is a perspective view showing a partial internal arrangement of the absolute position measuring apparatus.
Figure 3:
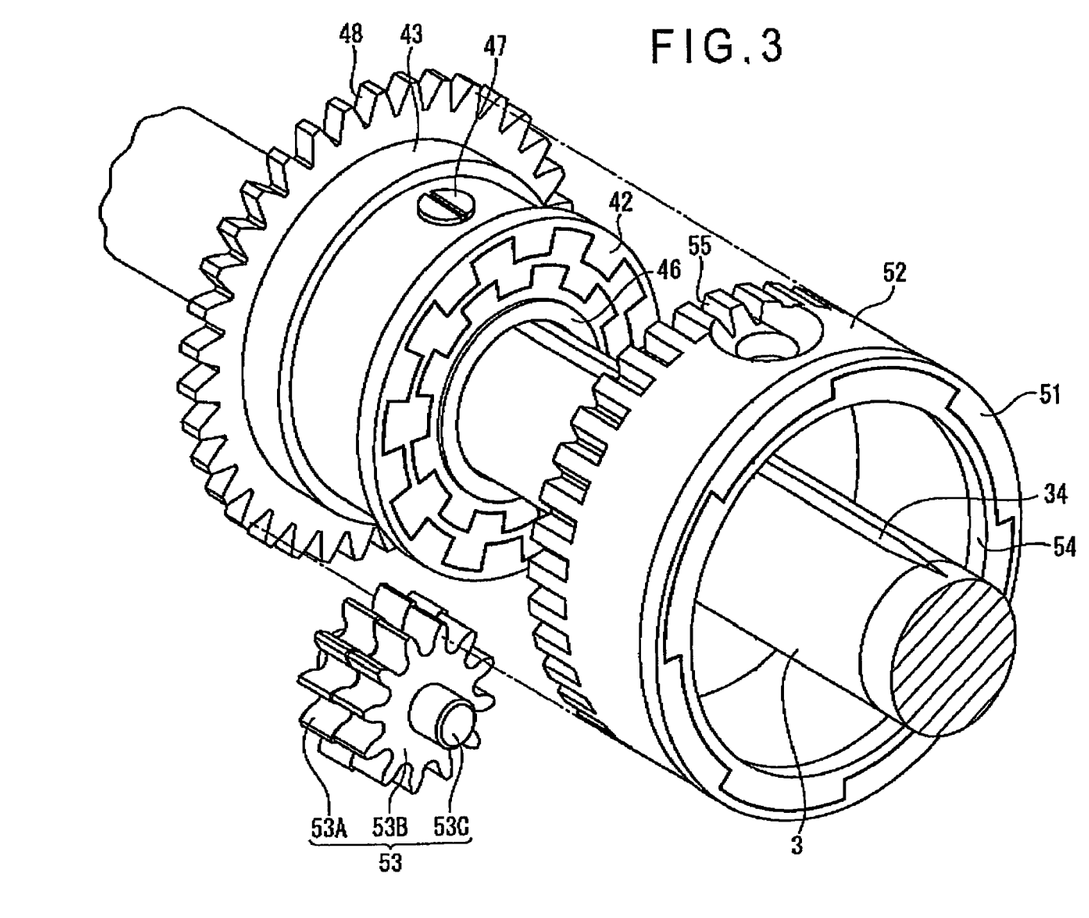
FIG. 3 is an exploded perspective view showing the partial internal arrangement of the absolute position measuring apparatus.

FIG. 1 is a cross-sectional view showing an arrangement of the micrometer head. FIGS. 2 and 3 are a perspective view and an exploded perspective view respectively showing a main portion of rotary encoders.

The micrometer head 1 includes: a main body 2; a spindle 3; rotary encoders 4 and 5 as phase signal transmitters; a transmission/reception controller 6; an arithmetic processor 7; a display 8; in which an absolute position of the spindle 3 is calculated by the arithmetic processor 7 to be displayed on the display 8.

Each component of the micrometer head 1 will be described below with reference to FIGS. 1 to 3.

The main body 2 is substantially cylindrical and includes accommodating spaces 21 and 22 therein. The accommodating spaces 21 and 22 are separated by a partition 23. Through-holes 24 and 25 are provided respectively on an end portion of the substantially cylindrical main body 2 at a distal end side of the spindle 3 (a left side in FIG. 1) and on the partition 23. An internal thread 26 is provided on another end portion of the main body 2 at a base end side of the spindle 3 (a right side in FIG. 1). The through-holes 24 and 25 and the internal thread 26 are coaxially positioned.

The spindle 3 is substantially columnar and includes a contact surface 31 that contacts an object to be measured (not shown) on the distal end of the spindle 3 and a knob 32 on the base end of the spindle 3. The knob 32 is used for rotating the spindle 3 from outside of the main body 2. The spindle 3 is inserted into the through-holes 24 and 25 of the main body 2 and both ends of the spindle 3 are projected from the main body 2. A feed screw 33 is provided on an outer circumference of the spindle 3 to be screwed with the internal thread 26 of the main body 2. When the knob 32 is rotated, the spindle 3 is advanced and retracted along the through-holes 24 and 25 due to the screw-engagement between the feed screw 33 and the internal thread 26. For example, the feed screw 33 may be carved for 40 rotations with a 0.5 mm pitch such that an axial movable distance of the spindle 3 is 20 mm. A key groove 34 is linearly provided in a substantially center of the spindle 3 along an axial direction of the spindle 3.

The first rotary encoder 4 and the second rotary encoder 5 are accommodated in the accommodating space 22 of the main body 2.

The first rotary encoder 4 includes a stator 41, a first rotor 42 and a first rotary cylinder (a holder) 43.

The stator 41 has an insert hole 44 into which the spindle 3 is inserted at the center of the disc, and is fixed to the partition 23. Specifically, the stator 41 is fitted around a peripheral member 27 that is provided around the through-hole 25 of the partition 23.

The first rotor 42 has an insert hole 45 into which the spindle 3 is inserted at the center of the disc, and is provided facing the stator 41 to be spaced apart from the stator 41 by a predetermined dimension.

The first rotary cylinder 43 is disposed to be closer to the distal end of the spindle 3 than the stator 41 with being inserted by the spindle 3, and rotatably supports the first rotor 42 about the axis of the spindle 3. A rotor supporter 46 is provided along the outer circumference of the spindle 3 on an end of the first rotary cylinder 43 at the stator 41 side. The first rotor 42 is fitted around an outer circumference of the rotor supporter 46.

Further, the first rotary cylinder 43 includes a screw key 47 screwed from its outer circumference to its center. An end of the key 47 is projected from an inner circumference of the first rotary cylinder 43 and engaged with the key groove 34 on the outer circumference of the spindle 3. Accordingly, when the spindle 3 is rotated, the first rotary cylinder 43 is rotated in synchronization with the spindle 3 due to the engagement between the key groove 34 of the spindle 3 and the key 47.

A first gear 48 is provided on the outer circumference of the first rotary cylinder 43. The gear 48 is provided on an end of the first rotary cylinder 43 at the distal end side of the spindle 3, and has the largest outer diameter among other outer diameters of the rotary cylinder 43. For example, the first gear 48 is set to have 40 cogs.

The second rotary encoder 5 includes the above-described stator 41, a second rotor 51, a second rotary cylinder (a holder) 52 and a relay gear 53.

Since the first rotary encoder 4 also includes the stator 41, the stator 41 is a common component of both of the first rotary encoder 4 and the second rotary encoder 5.

The second rotor 51 has a hole 54 that can dispose the first rotor 42 at the center of the disc, and is disposed on an outer circumference of the first rotor 42. The second rotor 51 is also provided facing the stator 41 to be spaced away from the stator 41 by a predetermined dimension as well as the first rotor 42. Surfaces of the respective rotors 42 and 51 which face to the stator 41 are substantially in the same plane.

The second rotary cylinder 52 is supported by the first rotary cylinder 43 while the first rotary cylinder 43 (excluding the first gear 48) is penetrated therein. The second rotor 51 is attached to an end portion of the second rotary cylinder 52 at the stator 41 side. The second rotor 51 is rotatably supported around the axis of the spindle 3. In other words, the rotary encoders 4 and 5 provide a double-cylinder structure of the inner and outer cylinders.

A second gear 55 is provided on an outer circumference of the second rotary cylinder 52. The gear 55 is provided on another end portion of the second rotary cylinder 52 at the distal end side of the spindle 3, and has substantially the same outer diameter as the gear 48 of the first rotary cylinder 43. For example, the second gear 55 is set to have 41 cogs, which means the second gear 55 has one more cog than the first gear 48.

The relay gear 53 is rotatably supported by the main body 2 to be meshed with both of the first gear 48 and the second gear 55. Specifically, the relay gear 53 has a first relay gear 53A that is meshed with the first gear 48, a second relay gear 53B that is meshed with the second gear 55 and a shaft 53C that coaxially supports these relay gears 53A and 53B. The relay gears 53A and 53B are set to have the same number of cogs, for example, 12 cogs. Each module of the first gear 48 and the first relay gear 53A as a pair of gears is coincident, and each module of the second gear 55 and the second relay gear 53B as another pair of gears is also coincident. Accordingly, when the first rotary cylinder 43 is rotated the second rotary cylinder 52 is smoothly rotated via the relay gear 53.

At this time, the rotors 42 and 51 are respectively rotated in a different speed since the gears 48 and 55 have a different number of cogs. For example, when the gear 48 has 40 cogs and the gear 55 has 41 cogs according to the exemplary embodiment, the first rotor 42 is rotated 40 times and the second rotor 51 is rotated 39 times while the spindle 3 is rotated 40 times in the axial movable range.

The first rotary encoder 4 and the second rotary encoder 5 can detect an absolute angle within one rotation of the respective rotors 42 and 51.

Specifically the stator 41 outputs a phase signal indicative of a change of one cycle per one rotation of the first rotor 42. Since the first rotor 42 is rotated in synchronization with the spindle 3, the phase signal with respect to the first rotor 42 indicates a change in a first cycle of the present invention by one rotation of the spindle 3. For example, a change of 40 cycles is indicated during 40 rotations of the spindle 3.

The stator 41 also outputs a phase signal indicative of a change in one cycle per one rotation of the second rotor 51. Since the second rotor 51 is rotated 39 times while the spindle 3 is rotated 40 times, the phase signal with respect to the second rotor 51 indicates a change in 39 cycles (i.e. a second cycle of the present invention) during 40 rotations of the spindle 3.

Figure 4:
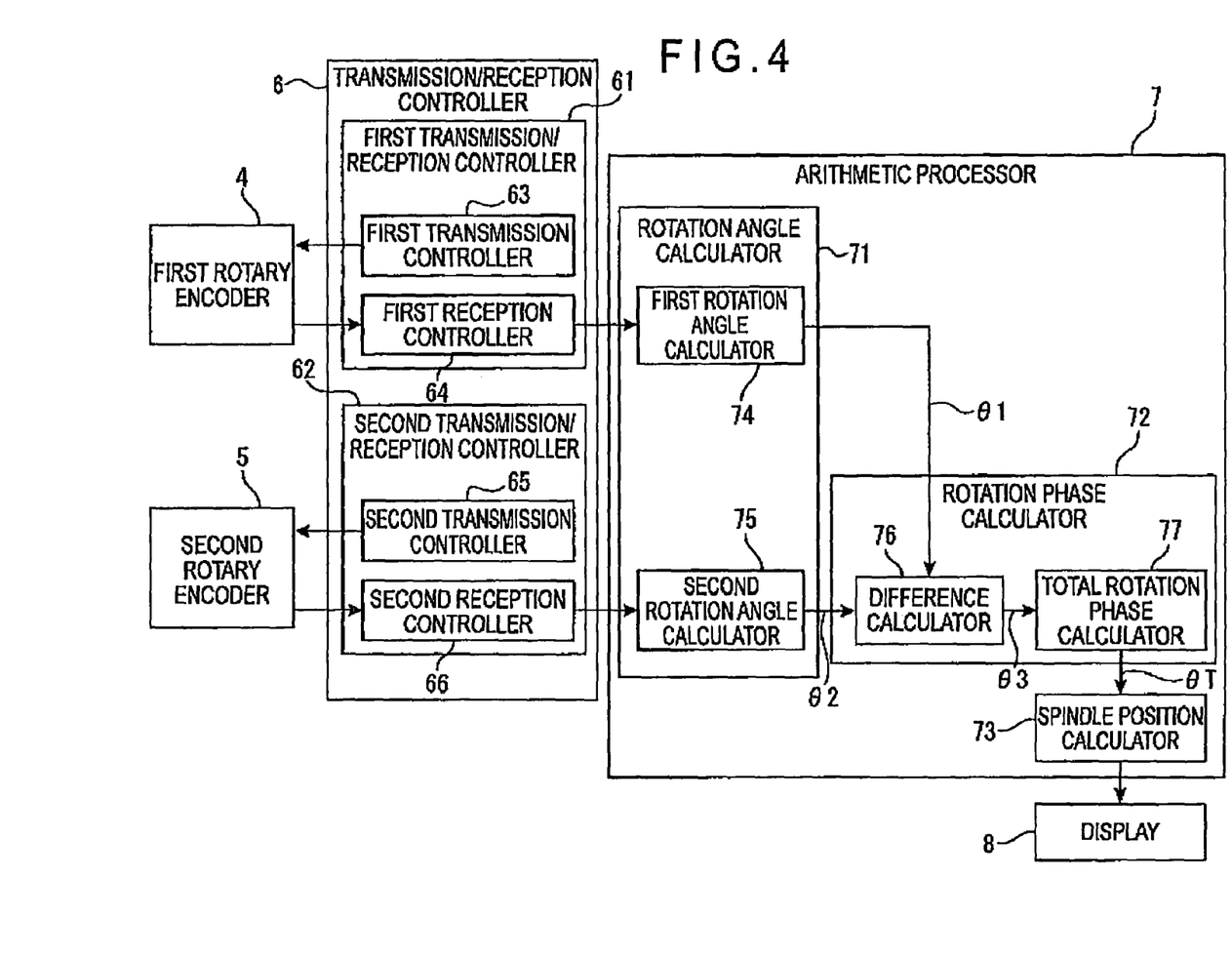
FIG. 4 is a block diagram illustrating a circuit arrangement of the absolute position measuring apparatus.

FIG. 4 illustrates an arrangement of the transmission/reception controller 6 and the arithmetic processor 7.

The transmission/reception controller 6 includes a first transmission/reception controller 61 that controls transmitting/receiving a signal with respect to the first rotary encoder 4, and a second transmission/reception controller 62 that controls transmitting/receiving a signal with respect to the second rotary encoder 5.

The first transmission/reception controller 61 includes a first transmission controller 63 that transmits to the stator 41 a predetermined alternating current signal with respect to the first rotor 42, and a first reception controller 64 that receives from the stator 41 a phase signal with respect to the first rotator 42.

Similarly, the second transmission/reception controller 62 includes a second transmission controller 65 that transmits to the stator 41 a predetermined alternating current signal with respect to the second rotor 51, and a second reception controller 66 that receives from the stator 41 a phase signal with respect to the second rotator 51.

The first transmission/reception controller 64 and the second transmission/reception controller 66 output to the arithmetic processor 7 the phase signals of the rotors 42 and 51 that are received from the stator 41.

The arithmetic processor 7 will be described below in greater detail.

The arithmetic processor 7 includes a rotation angle calculator 71 that calculates rotation angles θ1 and θ2 of the first rotor 42 and the second rotor 51 respectively, a rotation phase calculator 72 that calculates a rotation phase of the spindle 3 on the basis of the rotation angles θ1 and θ2 calculated by the rotation angle calculator 71, and a spindle position calculator 73 that calculates an absolute position of the spindle 3 on the basis of the rotation phase of the spindle 3 calculated by the rotation phase calculator 72.

The rotation angle calculator 71 Includes a first rotation angle calculator 74 that calculates the rotation angle θ1 of the first rotor 42 on the basis of the phase signal from the first transmission/reception controller 64, and a second rotation angle calculator 75 that calculates the rotation angle θ2 of the second rotor 51 on the basis of the phase signal from the second transmission/reception controller 66.

The first rotation angle calculator 74 calculates the rotation angle θ1 of the first rotor 42 as an absolute angle (0°<θ1<360°) within one rotation on the basis of the phase signal from the first transmission/reception controller 64. The phase signal from the first transmission/reception controller 64 does not have the same phase within one rotation of the first rotor 42 so that the first rotation angle calculator 74 stores a one-on-one relationship between the rotation angle θ1 of the first rotor 42 and the phase signal as a set. Accordingly, the unambiguous rotation angle θ1 of the first rotor 42 is determined in accordance with the phase signal that is output from the first transmission/reception controller 64, and the absolute angle of the first rotor 42 within one rotation is calculated.

As well as the first rotation angle calculator 74, the second rotation angle calculator 75 calculates the rotation angle θ2 of the second rotor 51 as an absolute angle within one rotation on the basis of the phase signal from the second transmission/reception controller 66.

The rotation phase calculator 72 includes a difference calculator 76 that calculates a difference θ3 between the rotation angles θ1 and θ2 of the respective rotor 42 and 51 calculated by the rotation angle calculator 71 and a total rotation phase calculator 77 that calculates a total rotation phase of the spindle 3 on the basis of the difference θ3.

The total rotation phase calculator 77 stores a one-on-one relationship between the difference θ3 and the total rotation phase of the spindle 3 as a set. Specifically, since the difference between the rotation angles θ1 and θ2 is set to be one rotation during 40 rotations of the spindle 3 in the axial movable range, the difference θ3 is calculated in the range of 0° to 360° and the total rotation phase θT of the spindle 3 is unambiguously calculated in accordance with the difference θ3.

The spindle position calculator 73 is preliminarily set to store a movable pitch (0.5 mm) per one rotation of the spindle 3. The spindle position calculator 73 multiplies the movable pitch (0.5 mm) by the total rotation phase θT, thereby calculating the total displacement of the spindle 3, i.e. the absolute position of the spindle 3.

The display 8 digitally displays the absolute position of the spindle 3.

An operation of the exemplary embodiment as stated above will be described below.

When the spindle 3 is rotated by the knob 32, the spindle 3 is advanced and retracted in the axial direction due to a screw-engagement between the internal thread 26 of the main body 2 and the feed screw 33 of the spindle 3. When the spindle 3 is rotated, the first rotary cylinder 43 is rotated together with the spindle 3 by the key 47 that is engaged with the key groove 34 of the spindle 3.

When the first rotary cylinder 43 is rotated, the first rotor 42 is rotated together with the first rotary cylinder 43. The rotation of the first rotor 42 is detected by the stator 41 to be transmitted to the first reception controller 64. Subsequently, the first rotation angle calculator 74 calculates the rotation angle θ1 of the first rotor 42 within one rotation.

It should be noted that the rotation angle θ1 of the first rotor 42 within one rotation represents a rotation angle of the spindle 3 within one rotation since the first rotor 42 is rotated in synchronization with the spindle 3.

When the first rotary cylinder 43 is rotated, the first relay gear 53A of the relay gear 53, which is meshed with the gear 48 of the first rotary cylinder 43, is rotated Subsequently, the gear 55 of the second rotary cylinder 52, which is meshed with the second relay gear 53B of the relay gear 53, is rotated, and the second rotor 51 is rotated together with the second rotary cylinder 52.

The phase signal of the second rotor 51 within one rotation is detected by the stator 41 to be transmitted to the second reception controller 66. Subsequently, the second rotation angle calculator 75 calculates the rotation angle θ2 of the second rotor 51 within one rotation.

Then, the total rotation phase calculator 72 calculates the difference θ3 between the rotation angles θ1 and θ2 of the respective rotors 42 and 51, thereby calculating the total rotation phase θT on the basis of the difference θ3. Finally, the spindle position calculator 73 calculates the absolute position of the spindle 3 on the basis of the total rotation phase θT and a feed pitch (0.5 mm) of the spindle 3, and the calculated absolute position is displayed on the display 8.

Such arrangement of the exemplary embodiment offers the following advantages.

(1) Since the second rotor 51 is rotated by the rotation of the first rotor 42 via the relay gear 53, a difference between the rotation speeds of the first rotor 42 and the second rotor 51 can be easily generated by providing 40 cogs for the first gear 48 and 41 cogs for the second gear 55. Accordingly, the cycles of the phase signals output from the respective rotary encoders 4 and 5 are differentiated so that the absolute position of the spindle 3 can be calculated on the basis of these two phase signals.

(2) Since the rotation of the first gear 48 is transmitted to the second gear 55 by the relay gear 53, it is not necessary to provide a conventional spiral key groove around the spindle in order to differentiate the phase signals obtained from the rotary encoders 4 and 5. Accordingly, the spindle 3 can be shortened relative to the axial movable range of the spindle 3, which easily allows downsizing of the apparatus and manufacturing costs reduction.

(3) The double cylinder structure including the first rotary cylinder 43 and the second rotary cylinder 52 is adopted on the outer circumference of the spindle 3. Accordingly, a space for the rotary cylinders 43 and 52 can be lessened in the axial direction of the spindle 3, as compared to the related art in which each rotary cylinder is provided in parallel in the axial direction of the spindle.

(4) Since the first rotor 42 and the second rotor 51 are fixed to the respective ends of the rotary cylinders 43 and 52 in a manner that the second rotor 51 is provided on the outer circumference of the first rotor 42, the stator 41 can be a component common to the respective rotary encoders. This allows to lessen a space for the stator 41 and to reduce a number of parts, which leads to simple assembly procedures.

(5) Since the first gear 48 of the first rotary cylinder 43 and the second gear 55 of the second rotary cylinder 52 are provided in parallel in the axial direction of the spindle 3 and have substantially the same outer diameters, the relay gear 53 can be simultaneously meshed with the first gear 48 and the second gear 55. Accordingly, as compared to an arrangement of the relay gear 53 including a multistage gear, a space for the relay gear 53 can be narrowed.

It should be understood that the present invention is not limited to the above-described exemplary embodiments but may include any modification or improvement made within a scope where an object of the present invention can be achieved.

Figure 5:
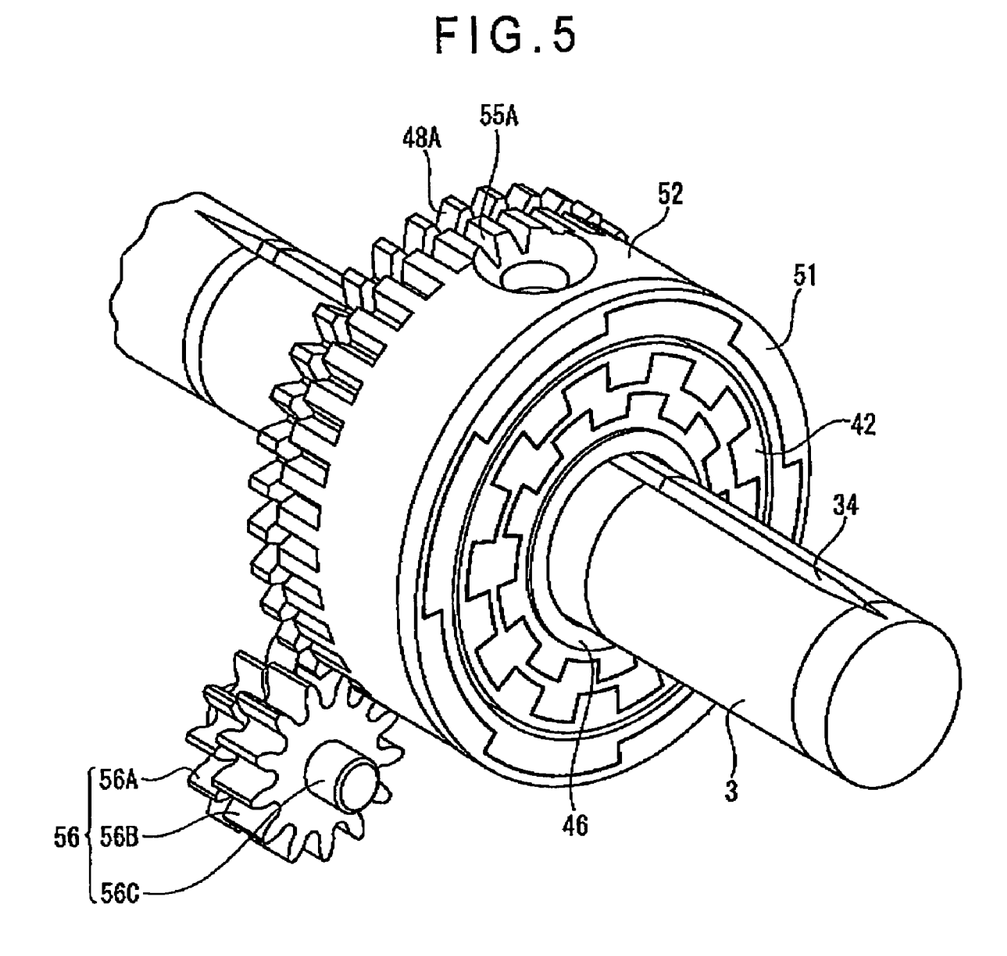
FIG. 5 is a perspective view showing a partial internal arrangement of an absolute position measuring apparatus according to a modification of the present invention.

For example, although the difference between the rotation speeds of the first rotor 42 and the second rotor 51 is generated by providing a different number of cogs for the first gear 48 and the second gear 55 respectively, a method to differentiate the rotation speeds of the respective rotors 42 and 51 is not limited thereto. As shown in FIG. 5, the relay gear 56 having the first relay gear 56A, the second relay gear 56B and the shaft 56C that coaxially supports the relay gears 56A and 56B may be used. Also, the number of the respective cogs of the first relay gear 56A and the second relay gear 56B may be set differently. For example, the first relay gear 56A may have 12 cogs and the second relay gear 56B may have 13 cogs in order to rotate the second rotor 51 more quickly than the first rotor 42. Further, the relay gear may include a multistage gear having a plurality of rotation axes. This allows to differentiate the rotation speeds of the respective rotors 42 and 51 even when the first gear 48A and the second gear 55A have the same number of cogs.

Furthermore, although the stator 41 is commonly used for the respective rotary encoders in the exemplary embodiment, a first stator for the first rotary encoder 4 and a second stator for the second rotary encoder 5 may be used. A double structure may be adopted by providing the second stator on an outer circumference of the first stator.

The priority application Number JP2007-203299 upon which this patent application is based is hereby incorporated by reference.

What is claimed is:

1. An absolute position measuring apparatus comprising:
a main body;
a spindle that is screwed with the main body to be advanceable and retractable while rotating about an axis thereof;
a first rotary encoder that detects the rotation of the spindle as a phase signal that varies in a first cycle;
a second rotary encoder that detects the rotation of the spindle as another phase signal that varies in a second cycle; and
an arithmetic processor that calculates an absolute position of the spindle based on the phase signals output from the first and second rotary encoders; wherein
the first rotary encoder includes: a first rotor; a first holder that rotatably holds the first rotor about the axis of the spindle and is rotated by the rotation of the spindle, the first holder being provided with a first gear on an outer circumference thereof; a first stator that is supported by the main body and provided facing the first rotor by a predetermined gap;
the second rotary encoder includes: a second rotor; a second holder that rotatably holds the second rotor about the axis of the spindle and is provided with a second gear on an outer circumference thereof; a second stator that is supported by the main body and provided facing the second rotor by a predetermined gap; a relay gear that transmits a rotation of the first gear to the second gear; and
the number of cogs for the first gear, the relay gear and the second gear is set to differentiate rotation speeds of the first gear and the second gear.

2. The absolute position measuring apparatus according to claim 1, wherein
the first holder is cylindrical along an outer circumference of the spindle,
the first rotor is fixed to a first end of the first holder,
the second holder is cylindrical along the outer circumference of the first holder,
the second rotor is fixed to a first end of the second holder and provided on the outer circumference of the first rotor, and
a surface of the first stator that faces the first rotor and a surface of the second stator that faces the second rotor are provided in the same plane.

3. The absolute position measuring apparatus according to claim 2, wherein
the first gear is provided to a second end of the first holder,
the second gear is provided on a second end of the second holder and in parallel to the first gear in the axial direction of the spindle, and
the relay gear includes a first relay gear that is meshed with the first gear, a second relay gear that is meshed with the second gear, and a shaft that coaxially supports the first relay gear and the second relay gear.

4. The absolute position measuring apparatus according to claim 1, wherein
the first gear is provided to a second end of the first holder,
the second gear is provided on a second end of the second holder and in parallel to the first gear in the axial direction of the spindle, and
the relay gear includes a first relay gear that is meshed with the first gear, a second relay gear that is meshed with the second gear, and a shaft that coaxially supports the first relay gear and the second relay gear.

* * * * *